(12) United States Patent
Miwa et al.

(10) Patent No.: US 9,302,663 B2
(45) Date of Patent: Apr. 5, 2016

(54) HYDRAULIC BRAKE DEVICE FOR VEHICLE

(71) Applicants: ADVICS CO., LTD., Kariya-shi (JP); TOYOTA JIDOSHA KABUSHIKI KAISHA, Toyota-shi (JP)

(72) Inventors: Akihiko Miwa, Kariya (JP); Yosuke Yamasoe, Kariya (JP); Hiroshi Isono, Toyota (JP); Yasuji Mizutani, Toyota (JP)

(73) Assignees: ADVICS CO., LTD., Aichi-Pref, Kariya (JP); TOYOTA JIDOSHA KABUSHIKI KAISHA, Aichi-Ken, Toyota-Shi (JP)

( * ) Notice: Subject to any disclaimer, the term of this patent is extended or adjusted under 35 U.S.C. 154(b) by 0 days.

(21) Appl. No.: 14/375,910

(22) PCT Filed: Mar. 21, 2013

(86) PCT No.: PCT/JP2013/058030
§ 371 (c)(1),
(2) Date: Jul. 31, 2014

(87) PCT Pub. No.: WO2013/141288
PCT Pub. Date: Sep. 26, 2013

(65) Prior Publication Data
US 2015/0021976 A1 Jan. 22, 2015

(30) Foreign Application Priority Data
Mar. 23, 2012 (JP) ................. 2012-066989

(51) Int. Cl.
*B60T 13/68* (2006.01)
*B60T 7/04* (2006.01)
(Continued)

(52) U.S. Cl.
CPC ............. *B60T 13/686* (2013.01); *B60T 7/042* (2013.01); *B60T 8/4077* (2013.01); *B60T 13/12* (2013.01); *B60T 13/143* (2013.01); *B60T 13/146* (2013.01); *B60T 13/58* (2013.01); *B60T 13/586* (2013.01); *F16D 61/00* (2013.01)

(58) Field of Classification Search
CPC ..... B60T 11/103; B60T 11/224; B60T 13/12; B60T 13/58; B60T 13/145; B60T 13/686; B60T 15/028
USPC ............................................ 303/6.01, 15, 20
See application file for complete search history.

(56) References Cited

U.S. PATENT DOCUMENTS

| 4,736,588 A | 4/1988 | Leiber |
| 4,843,819 A | 7/1989 | Leiber |

(Continued)

FOREIGN PATENT DOCUMENTS

| JP | 61-139548 A | 6/1986 |
| JP | 2002-37052 A | 2/2002 |

(Continued)

OTHER PUBLICATIONS

International Search Report (PCT/ISA/210) mailed on May 14, 2013, by the Japanese Patent Office as the International Searching Authority for International Application No. PCT/JP2013/058030.

(Continued)

*Primary Examiner* — Christopher Schwartz
(74) *Attorney, Agent, or Firm* — Buchanan Ingersoll & Rooney PC

(57) ABSTRACT

A vehicle hydraulic brake system of the brake-by-wire type includes input piston and a master piston configured to be actuated under hydraulic pressure introduced into a second fluid chamber and mounted in the housing so as to be movable relative to each other through a partition wall and a first fluid chamber. The piston defines therein a communication passage which extends from a fourth fluid chamber to the first fluid chamber and in which a check valve is mounted. When the piston is advanced under hydraulic pressure introduced into the second fluid chamber, the volume of the fourth fluid chamber decreases, while the volume of the first fluid chamber increases. This allows brake fluid in the fourth fluid chamber to be quickly released into the first fluid chamber through the communication passage and through a pipe line in which an electromagnetic on-off valve are mounted.

4 Claims, 3 Drawing Sheets

(51) Int. Cl.
  *B60T 13/14* (2006.01)
  *B60T 8/40* (2006.01)
  *B60T 13/12* (2006.01)
  *B60T 13/58* (2006.01)
  *F16D 61/00* (2006.01)

(56) References Cited

U.S. PATENT DOCUMENTS

2003/0071518 A1   4/2003  Kusano et al.
2005/0160730 A1   7/2005  Matsuno et al.
2013/0127240 A1*  5/2013  Noro et al. .................... 303/14
2015/0021977 A1*  1/2015  Miwa et al. .................... 303/15

FOREIGN PATENT DOCUMENTS

JP   2003-81081 A    3/2003
JP   2005-162139 A   6/2005
JP   2006-264358 A   10/2006
JP   2010-929 A      1/2010

OTHER PUBLICATIONS

Written Opinion (PCT/ISA/237) mailed on May 14, 2013, by the Japanese Patent Office as the International Searching Authority for International Application No. PCT/JP2013/058030.

* cited by examiner

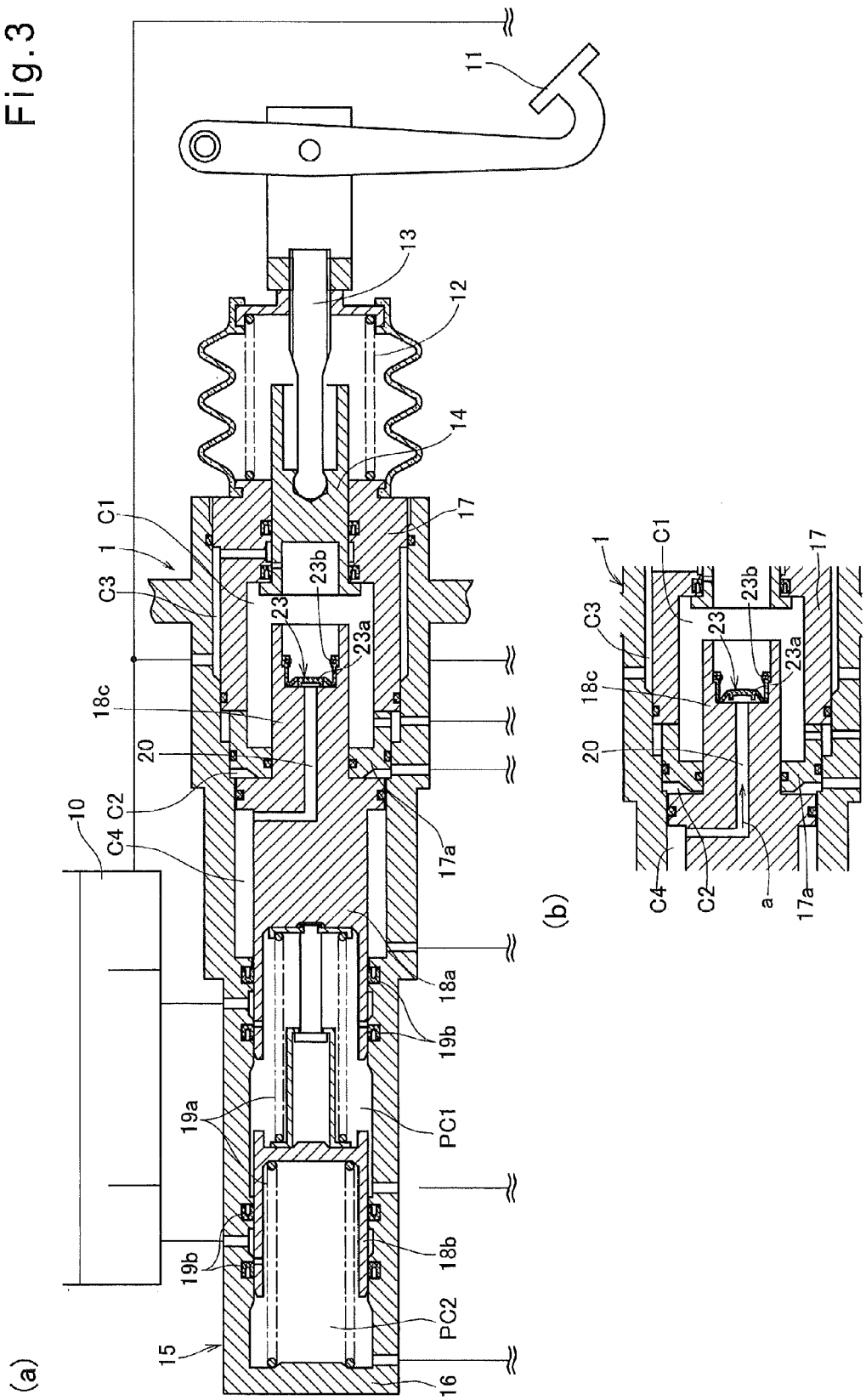

HYDRAULIC BRAKE DEVICE FOR VEHICLE

TECHNICAL FIELD

This invention relates to a vehicle hydraulic brake system which can perform regenerative cooperative braking and/or automatic braking, and which ensures good brake pedal operating feeling.

BACKGROUND ART

A vehicle hydraulic brake system of the brake-by-wire type is known in which hydraulic pressure supplied from a high hydraulic pressure source is adjusted by a pressure regulator to a value corresponding to brake operation by the driver, or to a value set independently of brake operation by the driver, by an electronic control unit, and brake hydraulic pressure is generated by actuating a master piston of a master cylinder using the hydraulic pressure adjusted by the pressure regulator as assist pressure (see paragraphs [0062] to [0100] and FIGS. 3 and 4, of the below-identified Patent document 1).

A typical vehicle hydraulic brake system of this type includes an input piston (such as the input piston 413 shown in FIG. 3 of Patent document 1) configured to be advanced under the brake operating force, a pressure regulator (such as the hydraulic pressure control valve 434 shown in FIG. 3 of Patent document 1) which adjusts hydraulic pressure supplied from a high hydraulic pressure source to a value necessary to generate a target braking force and feed the thus adjusted hydraulic pressure into a third hydraulic pressure chamber (such as the rear hydraulic pressure chamber R3 shown in FIG. 3 of Patent document 1), and a master cylinder (such as the one shown in FIG. 3 of Patent document 1 at 411) configured to generate brake hydraulic pressure by driving a master piston (such as the intermediate piston 414 shown in FIG. 3 of Patent document 1) under the hydraulic pressure adjusted by the pressure regulator.

The input piston is axially slidably inserted in a hole formed in the rear end of the master piston such that the front end of the input piston protrudes into an inter-piston chamber (such as the one shown in FIG. 3 of Patent document 1 at R5) formed in the master piston. The rear end of the master piston protrudes into the third fluid chamber. The gap between the inter-piston chamber of the master piston and the third fluid chamber is sealed by a high-pressure seal (such as the seal member 463 shown in FIG. 3 of Patent document 1) disposed between the inner peripheral surface of the bore of the master piston and the outer periphery of the input piston.

PRIOR ART DOCUMENT(S)

Patent Document(s)

Patent document 1: Japanese Patent Publication 2010-929A

SUMMARY OF THE INVENTION

Object of the Invention

In this type of vehicle hydraulic brake system, when hydraulic pressure adjusted by the pressure regulator is introduced into the third fluid chamber, this hydraulic pressure acts on the back surface of the master piston, thus advancing the master piston. When the master piston is advanced, the input piston is pulled forwardly by the master piston due to sliding resistance generated by the high-pressure seal disposed between the master piston and the input piston. This changes the volume of the inter-piston chamber, which in turn causes the reaction force to braking operation not to correspond to the brake operating amount, deteriorating the brake operating feeling.

An object of the present invention is to provide a brake-by-wire vehicle hydraulic brake system of the type disclosed in Patent document 1 which is free of the problem of deterioration in brake operating feeling.

Means for Achieving the Object

In order to achieve this object, in the above-described type of vehicle hydraulic brake system, the master piston, which is actuated under hydraulic pressure adjusted by the pressure regulator, and the input piston are provided separately from each other so as to be movable relative to each other, thereby preventing the input piston from being pulled by the master piston through a seal member.

Secondly, according to the present invention, a fluid chamber defined between the master piston and a housing is brought into communication with a fluid chamber defined between the input piston and the master piston through a pipe line in which an electromagnetic on-off valve is mounted such that when the master piston is advanced and the volume of the former fluid chamber decreases, brake fluid flows from the former fluid chamber into the latter fluid chamber until the hydraulic pressures in the two fluid chambers become equal to each other. This reduces fluctuations in hydraulic pressure in the latter fluid chamber, which acts on the input piston as a reaction force, thus reducing deterioration in brake operating feeling.

While it is possible to reduce fluctuations in hydraulic pressure in the latter fluid chamber due to the flow of brake fluid through the pipe line, brake fluid may not flow sufficiently quickly through the pipe line when the master piston is advanced, due to a delay in actuation of the electromagnetic on-off valve and the flow resistance of the pipe line. Due to the delay in transfer of brake fluid through the pipe line, hydraulic pressure in the latter fluid chamber may still fluctuate to such an extent as to deteriorate brake operating feeling.

Thus, according to the present invention, another communication passage is formed in the master piston through which the above two fluid chambers communicate with each other, and a hydraulic pressure equalizing mechanism is mounted in the communication passage.

The communication passage makes it possible to introduce necessary brake fluid more quickly and smoothly than the pipe line. This in turn prevents fluctuations in hydraulic pressure in the latter fluid chamber due to a delay in transfer of brake fluid, and thus prevents deterioration in brake operating feeling. In this arrangement, if the electric system fails, it is necessary to hold the hydraulic pressure in the latter fluid chamber in order to transmit the pressure applied to the brake pedal to the master piston. But if the above two fluid chambers are always in communication with each other, it is difficult to hold the hydraulic pressure in the latter fluid chamber if the electric system fails. Thus, according to the present invention, the hydraulic pressure equalizing system is mounted in the communication passage which prevents fluid flow from the latter fluid chamber to the former fluid chamber.

Specifically, the present invention provides a vehicle hydraulic brake system of the brake-by-wire type which is configured to adjust, in a pressure regulator, hydraulic pressure supplied from a high hydraulic pressure source to a value corresponding to braking operation, or to a value necessary to generate a target braking force set by an electronic control unit, actuate a master cylinder under the thus adjusted hydraulic pressure, generating a brake hydraulic pressure, and supply the brake hydraulic pressure to wheel cylinders, wherein an input piston configured to be advanced under the brake operating force, and a master piston configured to be advanced under the adjusted hydraulic pressure are mounted in a housing, wherein the input piston and the master piston are movable relative to each other through a partition wall provided within an inner surface of the housing and a first fluid chamber (corresponding to the above-mentioned latter fluid chamber) which applies reaction force to the input piston, wherein the master piston includes a small-diameter portion at a rear end of the master piston, wherein the small-diameter portion liquid-tightly and movably extends through the partition wall and protrudes into the first fluid chamber, wherein a second fluid chamber is defined between a rear end surface of the master piston from which the small-diameter portion protrudes and the partition wall such that brake fluid from the pressure regulator flows into the second fluid chamber, wherein a fourth fluid chamber (corresponding to the above-mentioned former fluid chamber) which functions as a second reaction chamber is defined between the front surface of an intermediate large-diameter portion of the master piston and the housing, wherein the master piston defines therein a communication passage through which the fourth fluid chamber communicates with the first fluid chamber, wherein the first fluid chamber communicates with the fourth fluid chamber through a pipe line in which an electromagnetic on-off valve is mounted, and wherein a hydraulic pressure equalizing mechanism between the first fluid chamber and the fourth fluid chamber is mounted in the communication passage.

The hydraulic pressure equalizing mechanism may be any one of a check valve mounted in the communication passage and configured to allow fluid flow from the fourth fluid chamber toward the first fluid chamber; a diaphragm mounted in the communication passage so as to isolate the first fluid chamber from the fourth fluid chamber; and a piston mounted in the communication passage so as to isolate the first fluid chamber from the fourth fluid chamber and so as to be movable in the direction in which fluid flows in the communication passage.

If the check valve is used, when the master piston is advanced, and the volume of the fourth fluid chamber decreases, the check valve opens due to a rise in hydraulic pressure in the fourth fluid chamber, allowing brake fluid in the fourth fluid chamber to flow (move) into the first fluid chamber, thus filling the expanded first fluid chamber with brake fluid. This flow of brake fluid offsets the increase in hydraulic pressure in the fourth fluid chamber and the reduction in hydraulic pressure in the first fluid chamber such that the hydraulic pressures in the first and fourth fluid chambers become equal to each other. This flow of brake fluid thus prevents fluctuations in hydraulic pressure in the first fluid chamber, and thus prevents deterioration in brake operating feeling.

If the diaphragm or the piston is used as the hydraulic pressure equalizing mechanism, when the master cylinder is advanced, the volume of the fourth fluid chamber decreases, while the volume of the first fluid chamber increases. But since the diaphragm or the piston is simultaneously moved toward the first fluid chamber due to increased hydraulic pressure in the fourth fluid chamber, the portion of the communication passage on the side of the fourth fluid chamber increases in volume, thus offsetting the reduction in volume of the fourth fluid chamber, while the portion of the communication passage on the side of the first fluid chamber decreases in volume, thus offsetting the increase in volume of the first fluid chamber. As a result, the movement of the diaphragm or the piston offsets the increase in hydraulic pressure in the fourth fluid chamber and offsets the reduction in hydraulic pressure in the first fluid chamber such that the hydraulic pressure of the first and fourth fluid chambers become equal to each other, in the same manner as the flow of brake fluid when the above-described check valve opens.

According to the present invention, the hydraulic pressures of the first and fourth fluid chambers are kept equal to each other by supplying brake fluid into the first and fourth fluid chambers such that the total amount of brake fluid in the first and fourth fluid chambers remains unchanged.

The vehicle hydraulic brake system according to the present invention may include an ABS unit including electromagnetic valves for increasing and reducing hydraulic pressures in wheel cylinders based on the command of an electronic control unit, and capable of performing ESC control too.

Advantages of the Invention

Since the vehicle hydraulic brake system according to the present invention is of the brake-by-wire type, of which the master piston is actuated under hydraulic pressure generated in the first fluid chamber and hydraulic pressure introduced into the second fluid chamber (assist pressure), separately from the input piston, this brake system is capable of performing regenerative cooperative braking and automatic braking.

Since the master piston, which receives hydraulic pressure in the second fluid chamber, is not in sliding contact with the input piston through a seal member, but is separated from the input piston, the input piston is not pulled by the master piston when hydraulic pressure is introduced into the second fluid chamber from the hydraulic pressure source.

The first fluid chamber and the fourth fluid chamber are in communication with each other through a pipe line in which an electromagnetic on-off valve is mounted such that when the master piston is advanced under pressure adjusted by the pressure regulator, brake fluid is released into the first hydraulic pressure chamber due to reduced volume of the fourth fluid chamber. With this arrangement, it is possible to prevent fluctuations in hydraulic pressure in the first fluid chamber, and fluctuations of the input piston. This practically completely eliminates the possibility of deterioration in brake operating feeling. According to the present invention, brake fluid also flows through the communication passage formed in the master piston, thus further reducing fluctuations in hydraulic pressure in the first fluid chamber. This prevents deterioration in brake operating feeling in the initial stage of transfer of brake fluid through the pipe line too.

BRIEF DESCRIPTION OF THE DRAWINGS

FIG. 3(a) is a partially omitted entire sectional view of still another embodiment; and FIG. 3(b) is a partial view of the brake system of FIG. 3(a), showing its operational state.

BEST MODE FOR EMBODYING THE INVENTION

Figure 1:
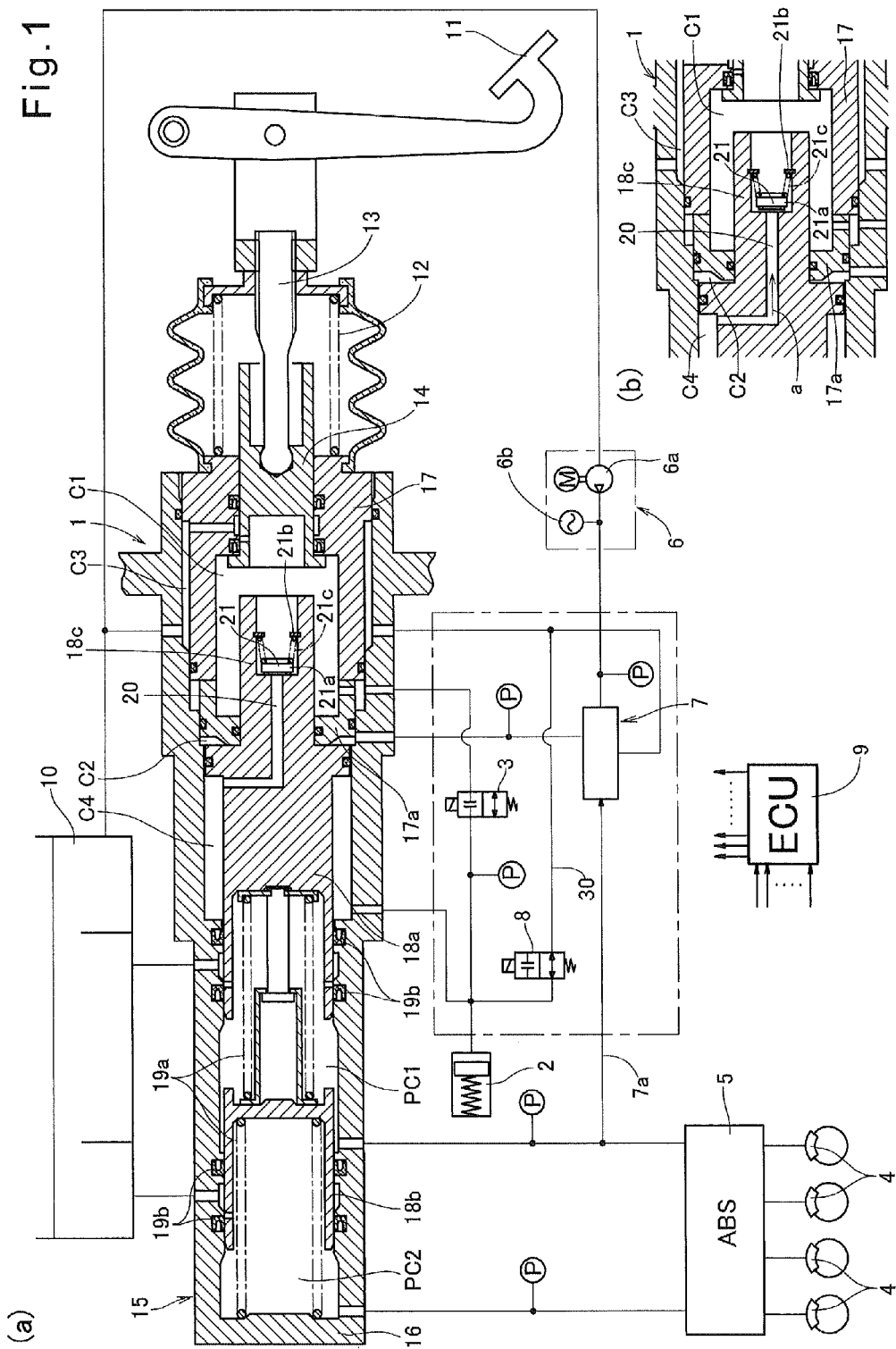
FIG. 1(a) is an entire sectional view of a vehicle hydraulic brake system embodying the present invention.
FIG. 1(b) is a partial view of the brake system of FIG. 1, showing its operational state.

Now referring to FIG. 1, a vehicle hydraulic brake system embodying the present invention is described. The vehicle hydraulic brake system shown includes a brake hydraulic pressure generator 1; a stroke simulator 2 which generates an operating reaction force corresponding to the brake operating amount; an electromagnetic on-off valve 3 which changes the way the brake simulator 2 is connected to the brake hydraulic pressure generator 1; wheel cylinders 4 which are actuated under hydraulic pressure generated by the brake hydraulic pressure generator 1, thereby applying braking force to the respective vehicle wheels; and an ABS unit 5 for adjusting, as necessary, brake hydraulic pressure supplied from the brake hydraulic pressure generator 1 to the wheel cylinders 4.

This brake system further includes a high hydraulic pressure source 6; a pressure regulator 7 for adjusting the hydraulic pressure supplied from the hydraulic pressure source 6 to a value necessary to generate a target braking force; an electromagnetic on-off valve 8 for selectively opening and opening a discharge line leading to a reservoir 10; and an electronic control unit (ECU) 9 configured to set the target braking force based on information from various known sensors such as a sensor for detecting how the brake is being operated and a sensor for detecting the behavior of the vehicle, and issue a command to adjust pressure to the pressure regulator 7. In particular, the electronic control unit 9 sets the target braking force based on information from various known sensors such as a sensor for detecting how the brake is being operated and a sensor for detecting the behavior of the vehicle, and controls the pressure regulator 7 such that hydraulic pressure introduced into a second fluid chamber C2 from the high hydraulic pressure source 6 is adjusted to a value necessary to generate the target braking force. The electronic control unit 9 also issues, as necessary, a command to adjust pressure to the ABS unit 5.

The brake hydraulic pressure generator 1 comprises a brake pedal 11, a return spring 12 biasing the brake pedal 11 in the return direction (rightwardly in FIG. 1(a)), an input rod 13 connected to the brake pedal 11, an input piston 14 configured to advance under the brake operating force transmitted from the brake pedal 11 through the input rod 13, and a tandem type master cylinder 15.

The master cylinder 15 includes a housing 16, and master pistons and a stationary partitioning member 17, both mounted in the housing 16. The input piston 14 liquid-tightly and movably extends through the partitioning member 17. With the input piston 14 extending through the partitioning member 14, the partitioning member 14 defines therein a first fluid chamber (first reaction force chamber) C1 of which the volume varies according to the axial position of the input, piston 14. A stroke simulator 2 is connected to the first fluid chamber C1 through the electromagnetic on-off valve 3, which selectively opens and closes the first fluid chamber C1. The second fluid chamber (boost chamber) C2 is provided forwardly of the first fluid chamber C1 through a partition wall 17a formed at the distal end of the partition member 17. A third fluid chamber C3 is defined around the rear end portion of the partition member 17. The third fluid chamber C3 communicates with the reservoir 10 and is thus kept at the atmospheric pressure.

The master pistons consist of a primary piston 18a and a secondary piston 18b. The primary piston 18a includes an intermediate large-diameter portion, and a small-diameter portion 18c protruding from the rear end of the intermediate large-diameter portion, liquid-tightly extending through the partition wall 17a, and protruding into the first fluid chamber C1. The intermediate large-diameter portion of the primary piston 18a has a back surface facing the second fluid chamber C2. A fourth fluid chamber (second reaction force chamber) C4 is defined around the portion of the primary piston 18a forwardly of the intermediate large-diameter portion. With this arrangement, when the primary piston 18a is advanced, the volume of the fourth fluid chamber C4 decreases, while the volume of the first fluid chamber C1 increases. The portions of the primary piston 18a that are involved in changing these volumes (portion of the primary piston 18a located forwardly of the intermediate large-diameter portion, and the small-diameter portion 18c) have such diameters that when the primary piston 18a is advanced, the volume of the fourth fluid chamber C4 decreases by the same amount by which the volume of the first fluid chamber C1 increases.

The fourth fluid chamber C4 communicates with the first fluid chamber C1 through a communication passage 20 extending from the outer peripheral surface of the primary piston 18a to the rear end surface of the small-diameter portion 18c. A check valve 21 is mounted in a large-diameter portion of the communication passage 20. The check valve 21 serves as a hydraulic pressure equalizing mechanism between the fourth fluid chamber C4 and the first fluid chamber C1. The check valve 21 includes a valve body 21a and a compression spring 21c mounted between the valve body 21a and a spring support 21b. The spring constant of the compression spring 21c is determined, e.g. by experiments, such that during a failure of the electric system, brake fluid can be sufficiently quickly fed into the first fluid chamber C1 through the communication passage 20, while holding the pressure in the first fluid chamber C1.

The master cylinder 15 further includes return springs 19a for returning the primary piston 18a and the secondary piston 18b, respectively, and cup seals 19b sealing the outer peripheries of the respective pistons. The master pistons 18a and 18b pressurize brake fluids in hydraulic pressure chambers PC1 and PC2 to generate brake hydraulic pressure. Such a master cylinder itself is known in the art.

The ABS unit 5 is a known pressure regulating unit including pressure reducing electromagnetic valves (not shown) for reducing, as necessary, the hydraulic pressure in the respective wheel cylinders 4, and pressure increasing electromagnetic valves (not shown either) for increasing, as necessary, the hydraulic pressure in the respective wheel cylinders 4.

The hydraulic pressure source 6, which includes a motor-driven pump 6a and a pressure accumulator 6b, is also known in the art.

The pressure regulator 7 includes a valve body (not shown) mounted therein and configured to be moved, under a pilot pressure introduced into the pressure regulator from the output line of the master cylinder 15 through a pilot line 7a, to a position corresponding to the magnitude of the pilot pressure, thereby adjusting the degree of opening of the valve portion so that hydraulic pressure from the hydraulic pressure source 6 is supplied to the second fluid chamber C2 after being adjusted (increased or reduced) to a value corresponding to the output pressure of the master cylinder 15. Such a pressure regulator is also known in the art.

The pressure regulator 7 adjusts the hydraulic pressure from the hydraulic pressure source 6 to a hydraulic pressure set by the electronic control unit 9 (which is, during normal braking or regenerative cooperative braking, an assist pressure corresponding to brake operation). The thus adjusted hydraulic pressure is introduced into the second fluid chamber C2 as assist pressure, and used to actuate the master cylinder 15 such that the master cylinder can generate a brake hydraulic pressure necessary to generate the target braking force.

In FIG. 1, the letter P indicates a hydraulic pressure sensor for detecting the hydraulic sensor at a predetermined portion.

In the vehicle hydraulic brake system of FIG. 1, while no large assist force based on the hydraulic pressure from the hydraulic pressure source 6 is necessary, such as during regenerative cooperative braking, the electromagnetic on-off valve 8 is closed as soon as the brake pedal 11 is depressed, while the electromagnetic on-off valve 3 is kept open, thus keeping the first fluid chamber C1 in communication with the fourth fluid chamber C4. In this state, hydraulic pressure from the hydraulic pressure source 6 is adjusted to a value corresponding to the brake operating amount by the pressure regulator 7; the thus adjusted hydraulic pressure is introduced into the second fluid chamber C2 as assist pressure; the primary piston 18a of the master cylinder 15 is advanced under the assist pressure; and the secondary piston 18b of the master cylinder 15 is advanced due to advancement of the primary piston 18a. As a result, brake hydraulic pressure is generated in the hydraulic pressure chambers PC1 and PC2.

When the primary piston 18a is advanced, the volume of the fourth fluid chamber C4 decreases, while the volume of the first fluid chamber C1 increases. Since the primary piston 18a and the chambers C1 and C4 are configured such that when the primary piston 18a is advanced, the volume of the fourth fluid chamber C4 decreases by the amount by which the volume of the first fluid chamber C1 increases, brake fluid a in the fourth fluid chamber C4 is released into the first fluid chamber C1 through the communication passage 20 formed in the master piston 18a and a pipe line 30, in which the electromagnetic on-off valve 3 is mounted. Thus, even though the volume of the first fluid chamber C1 increases, the hydraulic pressure in the first fluid chamber C1 changes little, so that the reaction force to depression of the brake pedal 11 is less likely to fluctuate. This improves brake operating feeling.

As soon as the volume of the fourth fluid chamber C4 decreases, the check valve 21 opens instantly due to a rise in pressure in the chamber C4, so that brake fluid a in the fourth fluid chamber C4 can be released quickly into the first fluid chamber C1 through the communication passage 20. Thus, even if brake fluid in the fourth fluid chamber C4 cannot be quickly released into the first fluid chamber C1 through the pipe line 30, brake fluid in the fourth fluid chamber C4 can be sufficiently smoothly released into the first fluid chamber C1 through the communication passage 20 alone. With this arrangement, brake fluid a can be moved more smoothly than in the arrangement in which brake fluid is moved only through the pipe line 30, so that it is possible to minimize the change in reaction force to depression of the brake pedal 11, and thus improve brake operating feeling.

In this arrangement, since the master cylinder 15 is separated from the input piston 14, the input piston 14 is never pulled by the primary piston 18a when hydraulic pressure is introduced into the second fluid chamber C2 from the hydraulic pressure source 6 during braking. Since the primary piston 18a and the chambers C1 and C4 are configured such that when the primary piston 18a is advanced, the volume of the fourth fluid chamber C4 that decreases is equal to the volume of the first fluid chamber C1 that increases, and the fourth fluid chamber C4 communicates with the first fluid chamber C1, the reaction force to depression of the brake pedal 11 increases corresponding to the brake operating amount. The brake operating feeling thus improves.

If the electric system fails, the electromagnetic on-off valve 3 is closed, so that the first fluid chamber C1 is sealed, while the electromagnetic on-off valve 8 is kept open. In this state, when the brake pedal 11 is depressed and the input piston 14 is moved correspondingly, the primary piston 18a is pushed under the hydraulic pressure in the first fluid chamber C1, thereby generating brake hydraulic pressure in the master cylinder 15 that depends on the brake operating force applied by a driver. This ensures safety for a passenger or passengers.

Figure 2:
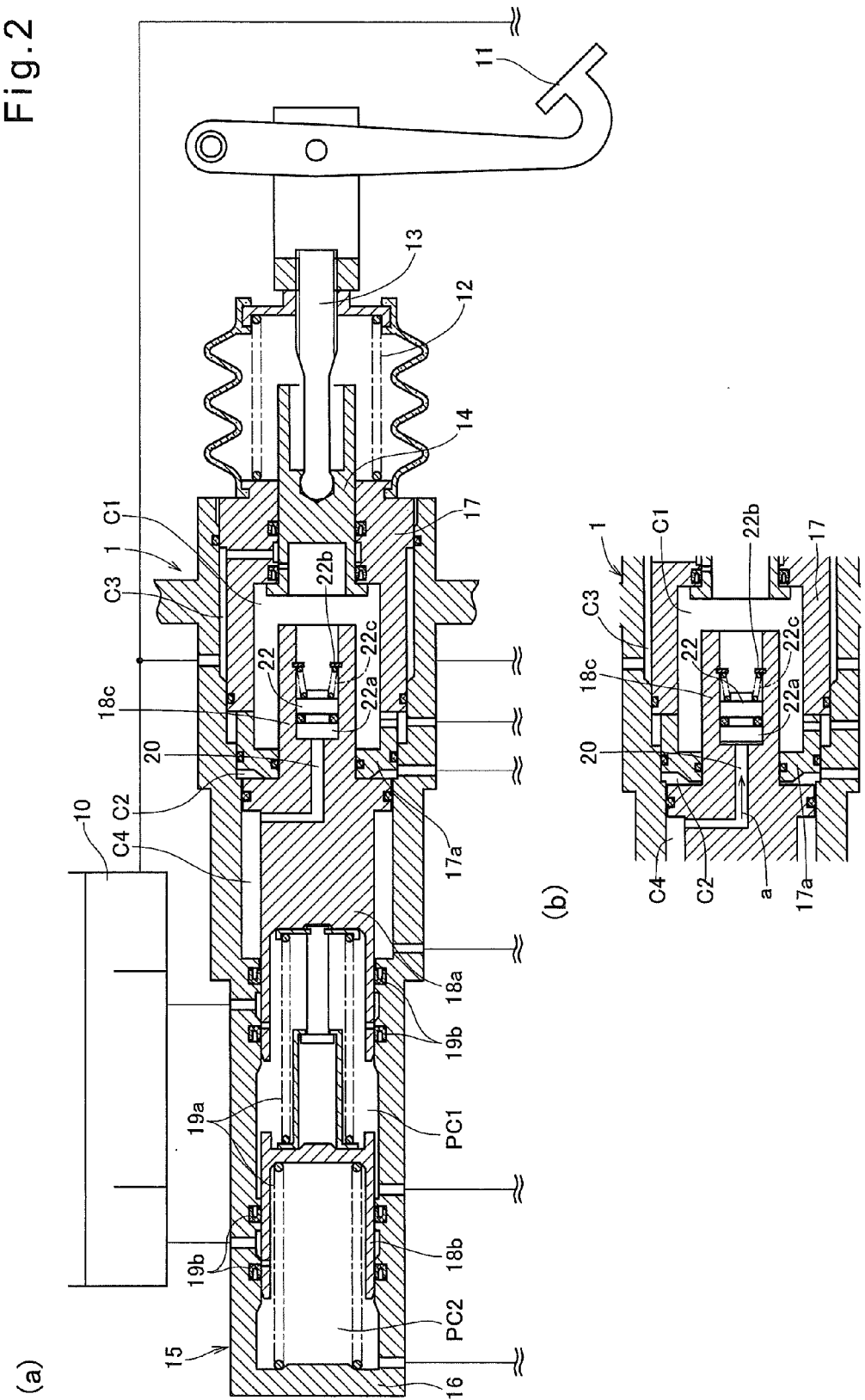
FIG. 2(a) is a partially omitted sectional view of another embodiment.
FIG. 2(b) is a partial view of the brake system of FIG. 2(a), showing its operational state.

In the above embodiment, the hydraulic pressure equalizing mechanism is the check valve 21. But instead, the hydraulic pressure equalizing mechanism may be in the form of a piston mechanism 22 shown in FIGS. 2(a) and 2(b), or a diaphragm mechanism 23 shown in FIGS. 3(a) and 3(b). Either of these embodiments includes all of the elements shown in FIG. 1, though some of them, such as the pressure regulator 7, are not shown in FIGS. 2 and 3. These omitted elements operate and function in exactly the same way as their counterparts shown in FIG. 1.

The piston mechanism 22 includes a piston 22a which shuts off the communication passage 20, and a compression spring 22c disposed between the piston 22a and a spring support 22b. As soon as the primary piston 18a is advanced and as a result, the volume of the fourth fluid chamber C4 decreases, thus increasing the pressure in the fourth fluid chamber C4, the piston 22a is quickly moved rightwardly as shown in FIG. 2(b). The movement of the piston 22a increases the volume of the portion of the communication passage 20 communicating with the fourth fluid chamber C4, thus compensating for the reduction in volume of the fourth fluid chamber C4. Simultaneously, the movement of the piston 22a reduces the volume of the portion of the communication passage 20 communicating with the first fluid chamber C1, thus compensating for the increase in volume of the first fluid chamber C1. As a result, the movement of the piston 22a keeps the hydraulic pressures of the first fluid chamber C1 and the fourth fluid chamber C4 equal to each other by offsetting the increase in pressure in the fourth fluid chamber C4 and the reduction in pressure in the first fluid chamber C1, due to the advancement of the primary piston 18a.

The diaphragm mechanism 23 includes a diaphragm 23a shutting off the communication passage 20. When the volume of the fourth fluid chamber C4 decreases and thus its hydraulic pressure increases, the diaphragm 23a is, in the similar manner to the piston 22a, quickly displaced (inflated) rightwardly as shown in FIG. 3(b). The displacement of the diaphragm 23a increases the volume of the portion of the communication passage 20 communicating with the fourth fluid chamber C4, thus compensating for the reduction in volume of the fourth fluid chamber C4. Simultaneously, the displacement of the diaphragm 23a reduces the volume of the portion of the communication passage 20 communicating with the first fluid chamber C1, thus compensating for the increase in volume of the first fluid chamber C1. As a result, the displacement of the diaphragm 23a keeps the hydraulic pressures of the first fluid chamber C1 and the fourth fluid chamber C4 equal to each other by offsetting the increase in pressure in the fourth fluid chamber C4 and the reduction in pressure in the first fluid chamber C1, due to the advancement of the primary piston 18a. In FIGS. 3(a) and 3(b), numeral 23b indicates a stopper for the diaphragm 23a.

With this arrangement, even if brake fluid a in the fourth fluid chamber C4 cannot be quickly released into the first fluid chamber C1 through the pipe line 30, the piston mechanism 22 or the diaphragm mechanism 23 sufficiently quickly adjust the hydraulic pressures of the first and fourth fluid chambers C1 and C4 so as to become equal to each other, thereby minimizing fluctuations in brake hydraulic pressure in the first fluid chamber C1 in the same manner as in the embodiment of FIG. 1. This in turn minimizes fluctuations in reaction force to depression of the brake pedal 11, thus preventing deterioration in brake operating feeling.

The spring constant of the compression spring 22c of the piston mechanism 22 and the elastic modulus (displacement rate) of the diaphragm 23a of the diaphragm mechanism 23 are determined, e.g. by experiments, such that the hydraulic pressures of the first and fourth fluid chambers C1 and C4 become equal to each other as quickly as possible, in the same manner as when adjusting the spring constant of the compression spring 21c of the check valve 21.

DESCRIPTION OF THE REFERENCE NUMERALS

1. Brake hydraulic pressure generator
2. Stroke simulator
3, 8. Electromagnetic on-off valve
4. Wheel cylinder
5. ABS unit
6. Hydraulic pressure source
7. Pressure regulator
9. Electronic control unit
10. Reservoir
11. Brake pedal
12. Return spring
13. Input rod
14. Input piston
15. Master cylinder
16. Housing
17. Partition member
17a. Partition wall
18a. Primary piston
18b. Secondary piston
20. Communication passage
21. Check valve as a hydraulic pressure equalizing mechanism
22. Piston mechanism as the hydraulic pressure equalizing mechanism
23. Diaphragm mechanism as the hydraulic pressure equalizing mechanism
C1. First fluid chamber (first reaction force chamber)
C2. Second fluid chamber (boost chamber)
C3. Third fluid chamber
C4. Fourth fluid chamber (second reaction force chamber)

What is claimed is:

1. A vehicle hydraulic brake system of a brake-by-wire type comprising an electronic control unit configured to adjust, in a pressure regulator, hydraulic pressure supplied from a high hydraulic pressure source to a value corresponding to braking operation, or to a value necessary to generate a target braking force set by the electronic control unit, and to actuate a master cylinder under the thus adjusted hydraulic pressure such that a brake hydraulic pressure is generated in the master cylinder and to wheel cylinders, wherein an input piston configured to be advanced under a brake operating force, and a master piston configured to be advanced under the adjusted hydraulic pressure are mounted in a housing, wherein the input piston and the master piston are movable relative to each other through a partition wall provided within an inner surface of the housing and a first fluid chamber, wherein the master piston includes a small-diameter portion at a rear end of the master piston, wherein the small-diameter portion liquid-tightly and movably extends through the partition wall and protrudes into the first fluid chamber, wherein a second fluid chamber is defined between a rear end surface of the master piston from which the small-diameter portion protrudes and the partition wall such that brake fluid from the pressure regulator flows into the second fluid chamber, wherein a fourth fluid chamber is defined between the master piston and the housing, wherein the master piston defines therein a communication passage through which the fourth fluid chamber communicates with the first fluid chamber, wherein the first fluid chamber communicates with the fourth fluid chamber through a pipe line in which an electromagnetic on-off valve is mounted, and wherein a hydraulic pressure equalizing mechanism between the first fluid chamber and the fourth fluid chamber is mounted in the communication passage.

2. The vehicle hydraulic brake system according to claim 1, wherein the hydraulic pressure equalizing mechanism is a check valve mounted in the communication passage and configured to allow fluid flow from the fourth fluid chamber toward the first fluid chamber.

3. The vehicle hydraulic brake system according to claim 1, wherein the hydraulic pressure equalizing mechanism is a piston mounted in the communication passage so as to isolate the first fluid chamber from the fourth fluid chamber and so as to be movable in a direction in which fluid flows in the communication passage.

4. The vehicle hydraulic brake system according to claim 1, wherein the hydraulic pressure equalizing mechanism is a diaphragm mounted in the communication passage so as to isolate the first fluid chamber from the fourth fluid chamber.

* * * * *